United States Patent [19]
Sarh

[11] Patent Number: 4,824,053
[45] Date of Patent: Apr. 25, 1989

[54] TELESCOPIC WING

[76] Inventor: Branko Sarh, 2957 Devonshire Rd., Riverside, Calif. 92506

[21] Appl. No.: 90,545

[22] Filed: Aug. 27, 1987

[51] Int. Cl.$^4$ .............................................. B64C 3/56
[52] U.S. Cl. ..................................... 244/218; 244/49
[58] Field of Search ................... 244/201, 218, 46, 49; 52/118; 254/102; 74/25; 403/43, 45

[56] References Cited

U.S. PATENT DOCUMENTS

| | | | |
|---|---|---|---|
| 2,056,188 | 10/1936 | Hayden | 244/218 |
| 2,423,095 | 7/1947 | Gibson | 244/218 |
| 3,851,978 | 12/1974 | Kuipers | 403/45 |

Primary Examiner—Galen Barefoot
Assistant Examiner—Rodney Corl
Attorney, Agent, or Firm—Herbert E. Kidder

[57] ABSTRACT

A telescopic airfoil comprising a plurality of short wing sections, each consisting of skin and rib, with tubular spar sections attached to the rib. Each spar section is adapted to telescope with respect to the next adjoining spar section toward the root end of the airfoil. Alternate spar sections are rotatable, and intermediate spar sections are held stationary, with the end portions of adjacent spar sections overlapping, and low-friction threads connecting the overlapping spar portions. The threads at opposite ends of each spar section are of opposite hand so that rotation of the rotatable spar sections causes the entire group to be drawn together into a housing at the root end of the wing. In this way, the wing span can be reduced to less than 30% of the full span, while during extension and retraction, the spars retain their full load-carrying capability.

20 Claims, 9 Drawing Sheets

TELESCOPIC WING

BACKGROUND OF THE INVENTION

In storing an airplane in a hangar, or while handling the airplane on the ground, the long wingspan is a disadvantage, limiting the flexibility of use and a more universal utilization of the airplane on the ground. The need for a design which will allow a substantial reduction of the wing span on the ground is obvious. Various design alternatives for reduction of the wing span, such as folding wings, which are used on military aircraft on carriers have been developed, and while the geometry and mechanism for folding wings is relatively simple, the concept is not suitable for applications where the aircraft is moved about on the ground at highway speeds. For one thing, wings folded up against the side of the fuselage present a large surface area which can be affected by side winds; and the center of gravity is raised or moved rearwardly, which is detrimental.

Another concept for reducing the wing span is to telescope the wing, which has the possibility of substantially contracting the span without many of the structural and other disadvantages of the folding wing. The center of gravity of the telescopic wing is not changed, and the side area affected by winds does not exist.

Various attempts have been made in the past to design a telescoping wing, but these have not been successful. One such attempt divides each wing into two sections, with the outer section being divided into several smaller spanwise sections which are telescoped into the inner section. In this design, the spars necessarily have a fairly large overlap due to their sliding relationship, and this reduces the total amount of span reduction so that the retracted wing is still more than 50% of the extended wing span. This is not enough of a span reduction to amount to a substantial improvement.

Another prior attempt at providing a telescopic wing used a plurality of wing sections, each consisting of the skin, a rib, and a tubular portion with an internally threaded collar at its end that meshes with threads on a short tubular spar section. The tubular spar sections are connected to one another, and are rotatable with respect to one another. Extension and retraction of the spar sections is supposed to be accomplished by rotating the innermost spar section, which is then supposed to screw into the next adjoining spar section. However, without some means to hold one spar section against turning while the next adjoining spar section is rotated, there can be no screwing together or apart. Because the spar is made up of several short tubular sections, each of which is rotatably connected to the next adjoining spars at both ends, the spar assembly has no torsional rigidity, and apparently torsional loads are supposed to be carried by the skin, which is completely impractical, since the skin sections are connected by rollers.

Several other concepts have been proposed, but each of them has had structural or other problems that have made the designs impractical, and therefore they have never been reduced to practice. Thus, while the telescoping wing appears to have many advantageous features, there has never been a practical design that could realize its advantages.

SUMMARY OF THE INVENTION

The primary object of the present invention is to provide a telescoping wing that can be retracted to less than 30% of the extended wing span, which makes it feasible for use in a roadable vehicle that travels on the highways.

Another object of the invention is to provide a telescoping wing in which the spar retains its full-carrying capability in the retracted as well as the extended condition, and in all intermediate positions.

Still a further object of the invention is to provide a telescoping wing wherein during extension and retraction of the wing, all load-carrying elements of the spar remain connected to each other by three linear and two rotational axis; and only one rotational degree of freedom is required for accomplishing extension and retraction of the wing.

These and other objects and advantages of the invention will become apparent to those skilled in the art from a consideration of the following detailed description of the preferred embodiments.

DESCRIPTION OF THE PREFERRED EMBODIMENT

Figure 1:
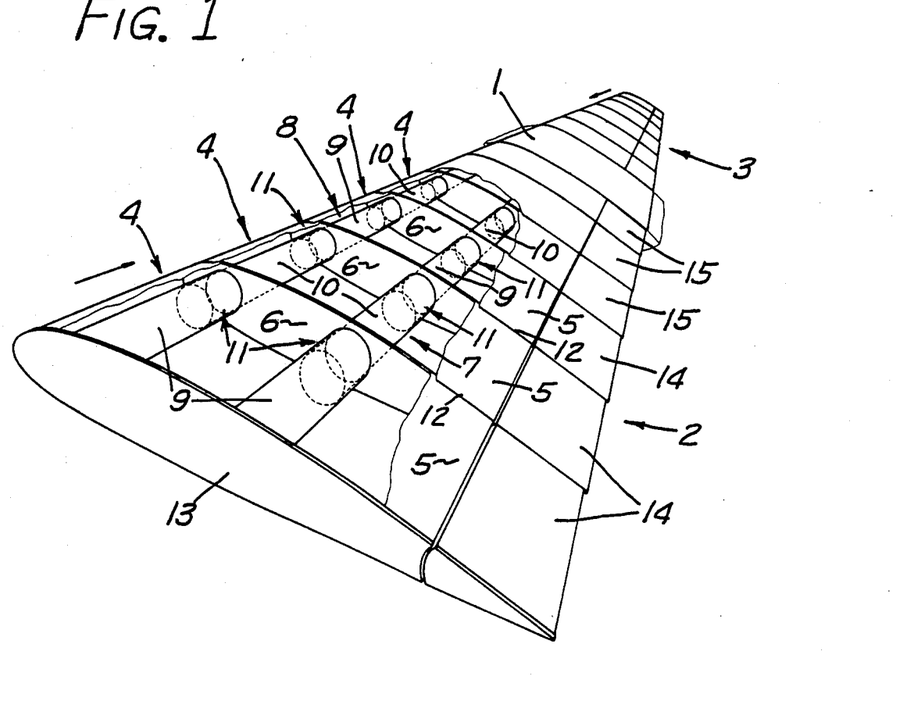
FIG. 1 is a perspective view of the telescopic wing of the invention, shown in the extended condition with a portion of the skin removed to show the internal construction in more-or-less diagrammatic form.

In FIG. 1, the telescopic wing of the invention is shown in the extended condition, comprising a central housing 1, left wing half 2, and right wing half 3. Each of the two wing halves consists of a plurality of short wing sections 4, comprising skin sections 5 attached to ribs 6, and carried by a tubular rear spar 7 and tubular front spar 8. Each of the spars 7 and 8 is sub-divided into non-rotatable spar sections 9 and rotatable spar sections 10; the rotatable and non-rotatable spar sections being disposed in alternating disposition so that each rotatable spar section is joined at opposite ends to two non-rotatable spar sections. The rotatable and nonrotatable spar sections overlap one another at 11, and are adapted to telescope with respect to one another when the wing is retracted, as will be described presently. The skin sections 5 also overlap at 12 and are slidable over one another. At the tip end of the outer wing section is an end plate 13, which closes the outer wing section. The trailing edge of each wing half is formed by telescoping aileron sections 14 and flap sections 15. The skin 5 is made of a thin sheet of rigid material, preferably a composite such as carbon fiber or the like, shaped to the airfoil section as defined by the rib 6.

Figure 2:
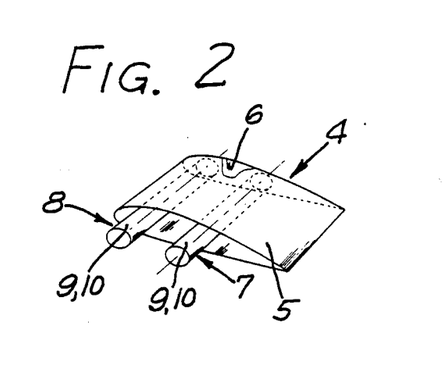
FIG. 2 is a perspective view of one of the wing sections, showing one embodiment of the invention in which the spar sections are disposed within the interior of the skin.
Figure 3:
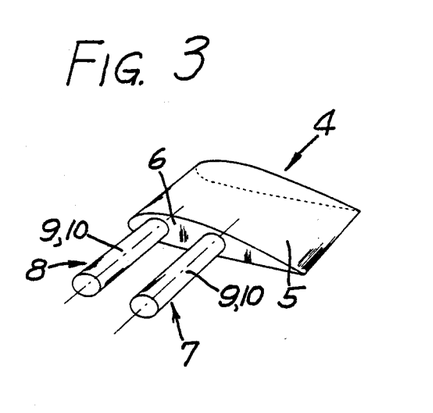
FIG. 3 is a perspective view of a single wing section, showing another embodiment of the invention, in which the spar sections are attached to the rib outside of the skin and extend in the opposite direction from the skin.

The wing sections 4 may be constructed as shown in FIG. 2, wherein the spar sections 9, 10 and skin section 5 both extend laterally from the same side of the rib 6, with the spar contained within the envelope of the skin. Alternatively, the wing sections 4 may be constructed as shown in FIG. 3, wherein the spar sections 9, 10 and skin section 5 extend laterally from opposite sides of the rib 6. Each of the two embodiments of FIGS. 2 and 3 has certain advantages as well as disadvantages over the other, which would be taken into consideration during the design of the aircraft. When using either of the constructions shown in FIGS. 2 or 3, various alternative configurations are possible, wherein the outer spar sections telescope into or over the adjoining inner spar section, and the outer skin section may slide over or under the adjoining inner skin section. Three of these possible alternative arrangements are shown in FIGS. 4, 5 and 6, which will now be described.

Figure 4:
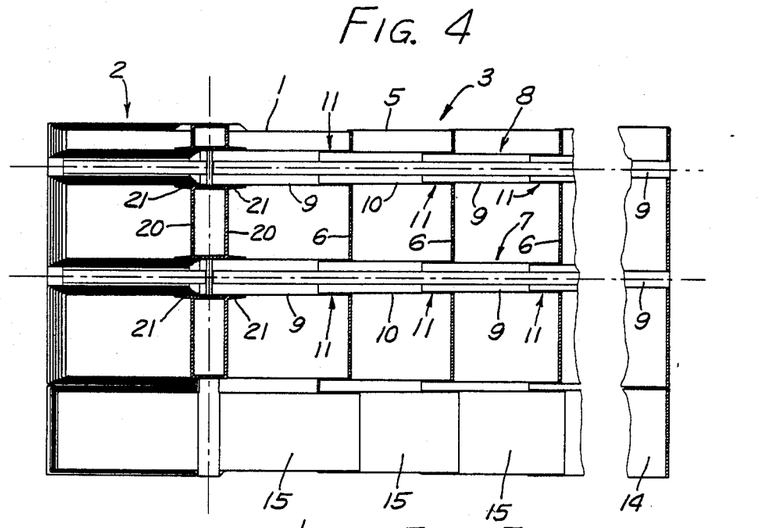
FIG. 4 is a horizontal section of a wing, taken through the axes of the spars, in which the left-hand wing is retracted and the right-hand wing is extended, and in which the skin and spar section arrangement are as shown in FIG. 2.

FIG. 4 is a horizontal section of a wing, taken through the axes of the spars 7,8, in which the left-hand half 2 is retracted, and the righthand wing half 3 is extended, and in which the skin 5 and spar sections 9 or 10 are as shown in FIG. 2. In this particular embodiment, the outer spar sections telescope into the adjoining inner spar sections, which has the advantageous feature of providing the largest spar diameter at the root end of the wing, and the smallest spar diameter at the tip end. The outer skin sections telescope over the adjoining inner skin sections, which results in the outer wing section being slightly larger than the root wing section. The central housing 1 has two laterally spaced, parallel walls 20, and projecting laterally from the walls 20 on the axes of the spars 7, 8 are collars 21, into which the root spar sections 9 are inserted and fixedly held. As mentioned earlier, the spar sections 9 are non-rotatable.

Figure 5:
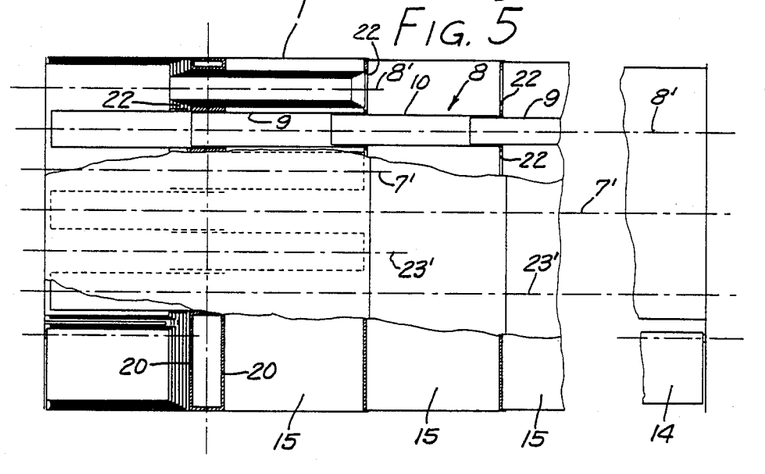
FIG. 5 is a view similar to FIG. 4, but differs from the latter in that the skin and spar section arrangement are as shown in FIG. 3, and the opposite spars are offset from one another so that the wing can be retracted into the smallest possible width.

In FIG. 5, left-hand wing half is retracted and the right-hand wing half is extended, but in this embodiment the skin and spar sections are on opposite sides of each rib, as in FIG. 3, and the spar and skin sections telescope inside the respective spar and skin sections of the adjoining wing section toward the root portion of the wing. The rear spars 7 of both the right-hand and left-hand wing halves are offset with respect to one another to allow enclosure of the telescoped spar and skin sections in a central housing of minimum width. To permit insertion of the spar sections on the one side of the wing centerline into the wing sections of the other side, each of the ribs 6 has holes 22 provided herein, through which the spars of the outer wing half pass freely. The advantage of this construction is that the largest spar diameter is at the wing root, and the smallest spar diameter is at the wing tip. Another advantage is that the skin sections are gathered inside the central housing 1, instead of on the outside, as in FIG. 4, and the smallest wing section is at the tip end of the wing, and the largest wing section is at the root end. To compensate for the difference in torsional rigidity between the left and right wing halves due to the offset spars, multiple spars can be used, of which one spar axis 23' is designated in FIG. 5. The axes of the other two spars are indicated at 8' and 7'.

Figure 6:
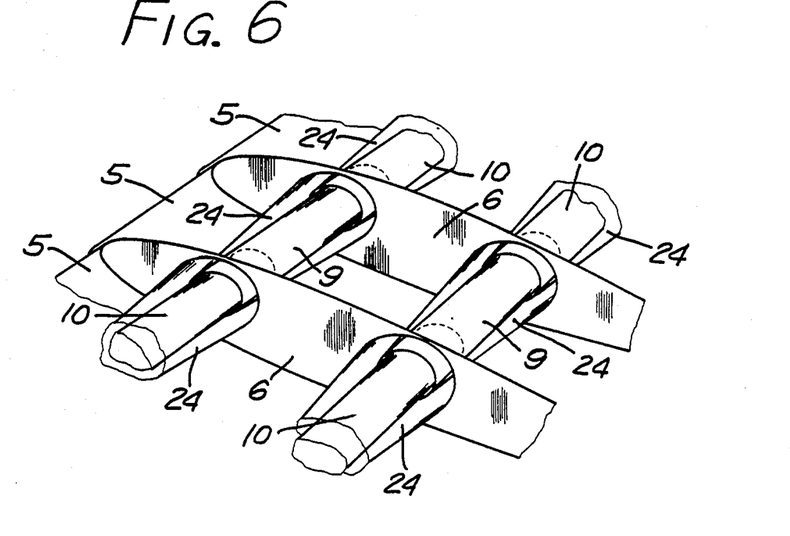
FIG. 6 is a fragmentary perspective view of a portion of a telescopic wing showing another embodiment of the invention, in which the skin and spar portions of each wing section telescope into the skin and spar portions of the next adjoining wing section toward the wing root.

FIG. 6 shows another embodiment of the invention, in which the skin and spar portions of each wing section telescope into the respective skin and spar portions of the next adjoining wing section toward the wing root. To accomplish this, another member 24 is provided which extends from the rib 6 on the same side as the skin section 5 and is connected at its other end to the respective spar portion 9 or 10, which is contained inside member 24. Member 24 may be slightly conical as shown in FIG. 6, but this is not essential. The advantage of this arrangement is that with the outer skin sections telescoping into the inner skin sections, and outer spar sections telescoping into the inner spar sections, with both skin sections and spar sections on the same side of the rib, the wing design is optimized without offsetting the spars, and allows use of the invention in wings of large dihedral angle.

Figure 7:
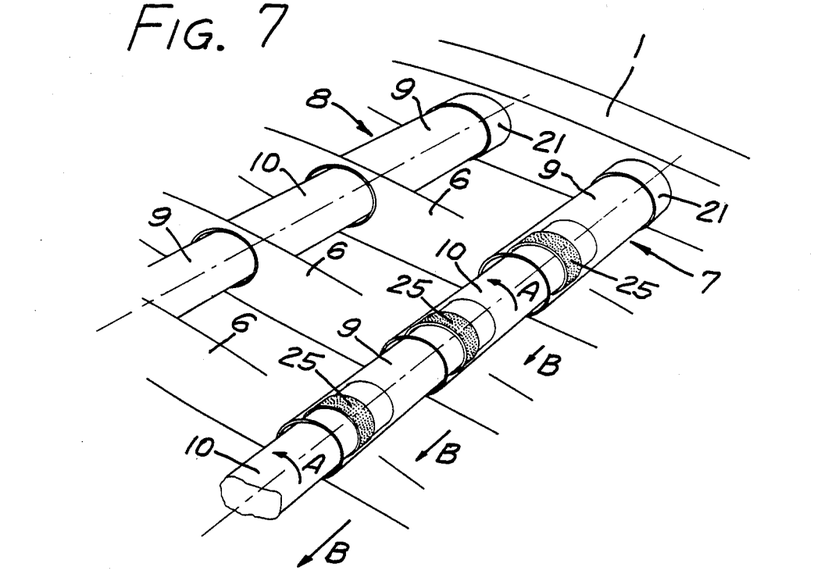
FIG. 7 is a fragmentary perspective view of a portion of telescopic wing illustrating the basic principle whereby the spars are extended by retracted by relative movement of the spar sections with respect to one another.
Figure 8:
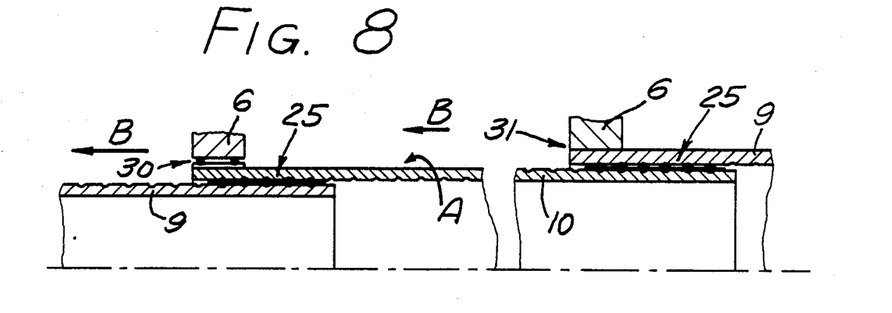
FIG. 8 is a fragmentary sectional view showing how the rotatable and stationary spar sections are connected to their respective ribs, and how rotational movement of the rotatable spar sections is translated into linear movement by the actions of the ball bearing interconnection between spar sections.

FIGS. 7 and 8 illustrate the dynamic principle of the invention whereby the spar is extended or retracted by rotating certain spar portions while preventing rotation of the other spar portions. In these Figures, the outer spar section telescopes into the adjoining inner spar section, and the innermost spar section 9 extends into and is fixedly connected to collar 21 on central housing 1. The adjoining rotatable spar section 10 extends into the outer end of the innermost spare section 9 and is rotatably interconnected by a rolling element bushing 25. At its opposite end, rotatable spar section telescopes over the rear end of the next adjoining non-rotatable spar section 9, and is interconnected to the latter by another rolling element bushing 25. This sequence of rotatable spar section followed by non-rotatable spar section followed by rotatable spar section is continued from the root end of the wing to the tip end thereof, with the overlapping portions interconnected with one another by rolling bushing elements. In FIG. 8, the nonrotatable spar section 9 at the right-hand end of member 10 is shown to be fixedly connected to its associated rib 6, while the left-hand end of member 10 is rotatably connected to its associated rib 6 by ball-bearing 30. In like manner, each non-rotatable spar portion 9 is fixedly connected at 31 to its associated rib 6, and each rotatable spar portion 10 is rotatably connected to its associates rib 6 by a bearing 30.

Figure 9:
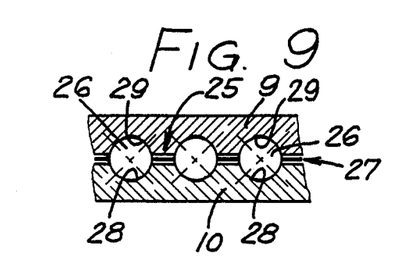
FIG. 9 is an enlarged fragmentary section through overlapping portions of two adjacent spar sections, showing the preferred ball bearing arrangement that provides a low-friction interconnection between them.

As best shown in FIG. 9, the rolling element bushings 25 each comprise a plurality of rolling elements such as ball bearings 26 or, alternatively, tapered bearings, roller bearings, or needle bearings, which are confined within a cylindrical, sleeve-like cage 27 that is disposed within the space between the overlapping spar portions 9 and 10. The balls 26 run in spiral, or helical, channels 28 and 29 formed in the opposed cylindrical surfaces of the overlapping spar portions, and these channels serve as races for the balls, and are equivalent of screw threads. The ball bearings 26 or other rolling elements are preloaded in their races to eliminate backlash. The bushings 25 of FIG. 8 show only 5 or 6 rows of balls for the purpose of clarity of illustration, but a more typical bushing would include 10 to 20 rows of balls, as shown in FIG. 17.

With reference now to FIG. 8, the right-hand end of rotatable spar portion 10 has a right-hand channel, or thread, formed in its outer surface, while non-rotatable spar portion 9 has a right-hand channel, or thread, formed in its inner surface. The fragmentary portion of bushing 25 shown in FIG. 9 depicts the right-hand end of spar portion 10 and its overlapping spar portion 9 of FIG. 8. At its left-hand end, spar portion 10 has a left-hand channel, or thread, formed in its inner surface, and its associated nonrotatable spar portion 9, which extends into spar portion 10, has a left-hand channel, or thread, formed in its outer surface. By virtue of this arrangement, rotation of spar member 10 in the direction shown by arrow A, will cause linear travel of member 10 to the left, as represented by letter B. At the same time, the left-hand member 9 also moves linearly in the direction B, but approximately twice the distance travelled by member 10. The same action is repeated with each pair of spar portions 9 and 10, and the result is that the wing is extended. Reversing the direction of rotation of spar portions 10 causes the wing to be retracted. By realizing this design concept wherein all spar portions are connected to one another by form-closed connections, relative motion of the spar portions with respect to one another along three linear and two rotational axes is prevented, and only one degree of freedom is left, which is the third rotational axis, and this is used to move the telescopic wing for extension and retraction thereof.

Figure 10:
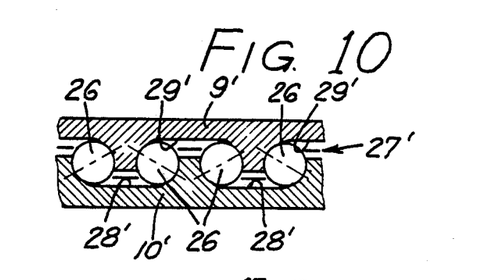
FIG. 10 is a view similar to FIG. 9, showing another embodiment of the ball bearing interconnection between spar sections.

FIG. 10 shows an alternative ball-bearing arrangement that might be used in the rolling element bushing 25. In this case, the ball bearings 26 are disposed in shallow, U-shaped channels 28' in spar section 10', and 29' in spar section 9'. There are two balls in each channel, and the balls in channel 28' bear against the opposite wall of channel 29'. The cage 27' has portions that are offset with respect to one another, as shown in FIG. 10, to confine the balls.

Figures 11, 12, 13:
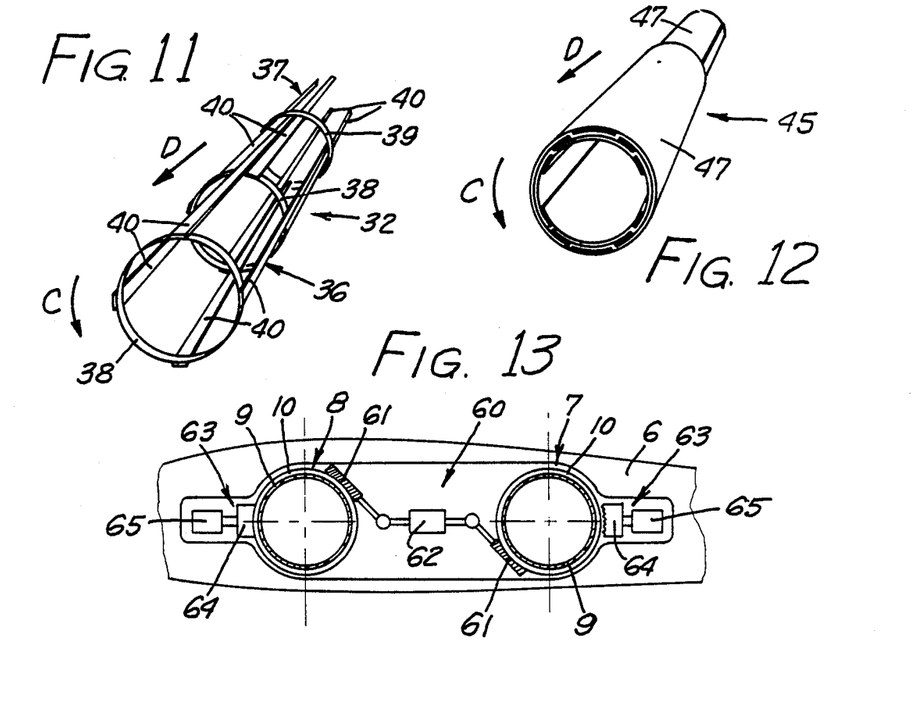
FIG. 11 is a fragmentary perspective view of a telescopic frame type spar drive mechanism for turning the rotatable spar sections to effect extension or retraction of the wing.
FIG. 12 is a view similar to FIG. 11, showing a tube-type spar drive mechanism as an alternative arrangement for turning the rotatable spar sections.
FIG. 13 is a vertical, chord-wise section through the two spars of a wing, showing another embodiment of the mechanism for rotating rotatable spar sections of the two spars, utilizing a motor and worm gear mounted on the rib.
Figures 16, 17:
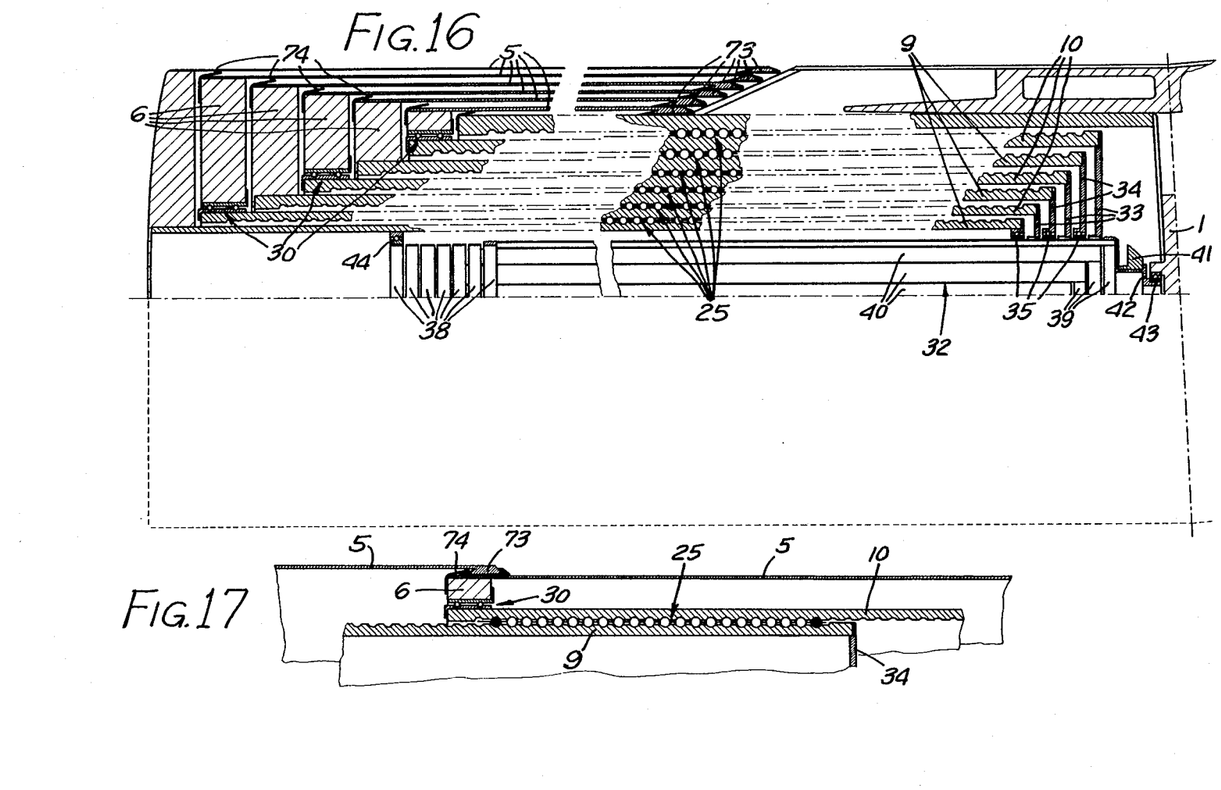
FIG. 16 is a vertical half-section through a telescopic wing, taken along the axis of one of the spars, showing the wing in the retracted condition; this being one embodiment of the invention wherein the outer spar sections telescope into the interior of the inner spar sections, and the outer skin sections telescope over the inner skin sections.
FIG. 17 is a fragmentary sectional view through two overlapping spar sections, with the wing in the extended condition, and also showing the arrangement for interlocking the skins, the spar and skin arrangements being the same as in FIG. 16.

The rotatable spar sections 10 are driven by a telescopic drive mechanism 32 shown more or less schematically in FIG. 11, and also shown in more detail in FIG. 16. The telescopic drive mechanism 32 is connected to rotatable spar sections 10 by disks 33 (FIG. 16); and to non-rotatable spar sections 9 by disks 34. Disks 33 are fixedly connected to portions of the drive mechanism 32, as will be described presently, while disks 34 are rotatably connected by bearings 35 to other portions of the drive mechanism. AS shown in FIG. 11, the drive mechanism 32 consists of a plurality of tubular frames 36 and 37, each of which comprises a pair of axially spaced rings 38 and 39 that are joined together by a plurality of circumferentially spaced parallel bars 40. Rings 38 are slightly smaller in diameter than rings 39 and are attached to the inside surface of bars 40, while rings 39 are attached to the outside surfaces of bars 40. This arrangement allows the ring 38 of frame section 37 to move axially within bars 40 of frame section 36, while bars 40 of tubular frame 36 are in sliding contact with bars 40 of tubular frame 37. The disks 33 of rotatable spar sections 10 are fixedly attached to the bars 40 of every other tubular frame section 36, and the disks 34 of non-rotatable spar sections 9 are rotatably connected by bearings 35 to the bars 40 of the intermediate frame sections 37. Thus, disks 33 might be fixedly connected to tubular frame sections 36, with disks 34 rotatably connected to tubular frame sections 37.

The drive mechainsm 32 is rotated by a bevel gear 41 (FIG. 16) which is driven by another bevel gear (not shown) that is driven, in turn, by a motor or manually from the fuselage of the airplane. Bevel gear 41 is mounted on a hub 42 which is rotatably supported by a bearing 43 in the central housing 1. Hub 42 has a flange that is fixedly connected to the innermost tubular frame of the mechanism 32, and therefore rotation of the bevel gear 41 causes the entire drive mechanism 32 to rotate as a unit, since the several tubular frames are connected togehter, and their respective bars 40 are in contact with one another around the entire periphery of the drive mechanism. The outermost tubular frame is stabilized inside the smallest spar section 9 by a bearing 44 (FIG. 16). As the drive mechanism 32 rotates in the direction of the arrow C (see FIG. 11), rotational movement is transferred by disks 33 to the rotatable spar sections 10, and this causes the linear movement of the spar, as was described above, while the spar portions 9 and 10, through disks 33, 34, cause the tubular frame portions 36, 37 to move linearly in the direction of the arrow D.

FIG. 12 shows an alternative drive mechanism 45, using the same general mode of operation as in FIG. 11, but employing cylindrical tubular elements 46 and 47 that are telescopically related to one another, and are connected by sliding portions that permit relative linear movement while preventing relative rotational movement.

FIG. 13 shows still another arrangement that might be used as an alternative drive mechanism for driving the rotatable spar sections 10, in which each pair of rotatable sections of spars 7 and 8 is driven through worm gears 61 by a motor 62 or other means mounted on the rib 6. The worm gears 61 mesh with ring gears (not shown) on spar sections 10, preferably producing opposite rotation of the sections 10 on spars 7 and 8. The helical ball channels 28, 29 of the spar sections are appropriately left-hand or right-hand so that the spars 7 and 8 both extend or retract simultaneously. To eliminate any possible backlash between the worm gear 61 and its respective ring gear, when the wing is extended, a locking device 63 is provided alongside each spar 7, 8, consisting of a toothed member 64 and actuator 65. The actuator 65 presses the toothed member 64 into engagement with the teeth on the ring gear, thereby locking the rotatable spar section against any rotational movement. The advantages of this drive mechanism embodiment are that it permits more precise rotational control of the rotatable spar sections, and the worm gear drive provides a self-locking feature.

Figures 14, 15, 22, 23, 24, 25, 26, 27, 28:
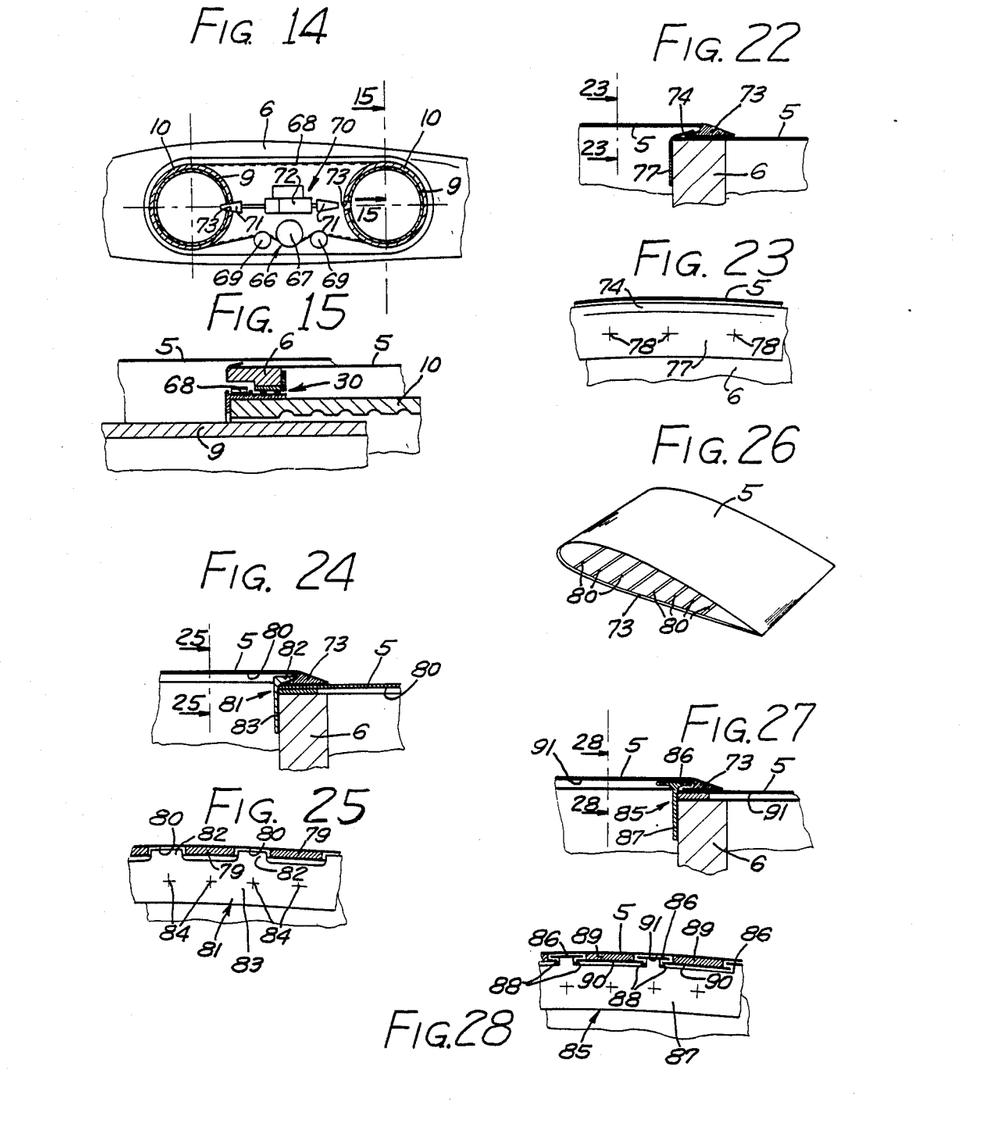
FIG. 14 is a view similar to FIG. 13, but showing another embodiment of the spar drive system, using a motor and belt drive, and also having an interlocking system for locking the rotatable and stationary spar section together.
FIG. 15 is an enlarged sectional view, taken at 15—15 in FIG. 14.
FIG. 22 is an enlarged fragmentary sectional view through a portion of one rib and the skins of two wing sections in the extended-wing condition, showing the interlock between the skins.
FIG. 23 is a sectional view taken at 23—23 in FIG. 22.
FIG. 24 is a view similar to FIG. 22, showing another embodiment of the interlock arrangement between the skins.
FIG. 25 is a sectional view taken at 25—25 in FIG. 24, showing the U-type channels in the skin interior.
FIG. 26 is a fragmentary perspective view of one wing skin, showing the channels in the interior surface.
FIG. 27 is a view similar to FIGS. 22 and 24, showing another embodiment of the interlock arrangement between the skins.
FIG. 28 is a sectional view taken at 28—28 in FIG. 27, showing the C-type channels in the skin interior.

FIG. 14 shows still a further embodiment of drive mechanism 66 using a motor 67 driving a toothed belt 68 which is wrapped around rotatable spar sections 10 and meshes with teeth on the latter. Idler pulleys 69 are provided to tension the belt and to hold the latter into good driving contact with the sprocket on motor 67. The drive mechanisms 66 are mounted on the ribs 6 which hold the rotatable spar sections 10. FIG. 14 also shows a locking mechanism 70 which rigidly locks the rotatble and non-rotatable spar sections together. Locking mechanism 70 comprises a pair of tapered pins 71 projecting from opposite sides of an actuator 72, and these pins are forced into aligned holes 73 in the overlapping portions of spar sections 9 and 10. FIG. 15 is a cross-sectional view showing the toothed belt 68 passing over the rotatable spar section 10 directly behind the bearing 30. Drive mechanism 66 has the desirable advantage of being somewhat more compact and lighter in weight than the drive mechanism 60 of FIG. 13, but still has all the functional advantages of the latter. Locking mechanism 70 has the desirable feature of positively locking the rotatable and non-rotatable spar sections together so that there can be no relative movement between them in either the extended or retracted condition, which is particularly advantageous in the extended conditon. A locking device such as 70 could also be used on the embodiments shown in FIGS. 16, 18, 20 and 22.

FIG. 16 shows a retracted wing of the configuration in which the outer spar sections telescope into the interior of the inner spar sections, and the outer skin sections telescope over the inner skin sections. The terms "inner" and "outer" when applied to the spar sections or skin sections, refer to the span-wise dimension of the wing; "outer" referring to the outer tip end of the wing, and "inner" referring to the root end of the wing, which is where the central housing 1 is located. FIG. 16 also shows interlocking formations 73 at the inner ends of the skin sections 5, which extend around the entire wing profile. These formations 73 fit snugly over the next inside skin section and slide freely thereover when the wing is being extended or retracted. As the wing approaches the fully extended condition, a tapered inside edge of the formation 73 engages and seats firmly under an inwardly facing, outwardly bent flange 74 on the rib 6 of the inside skin section. This is shown in FIG. 17. The purpose of the formation 73 interlocking with the flanges 74 is to prevent the skin sections from lifting away from the rib and underlying skin sections while at the same time permitting a limited amount of sliding motion between adjacent skin sections as the wing flexes under load. With this construction, the skin 5 of each section accumulates the aerodynamic loads of that section and transmits the loads to its associated rib, which in turn transmits the load to its respective spar sections. Thus, each spar section carries the load of its respective wing section as well as the accumulated loads of all outboard spar sections, and ach spar section transfers its load to the next inboard spar section.

Figure 18:
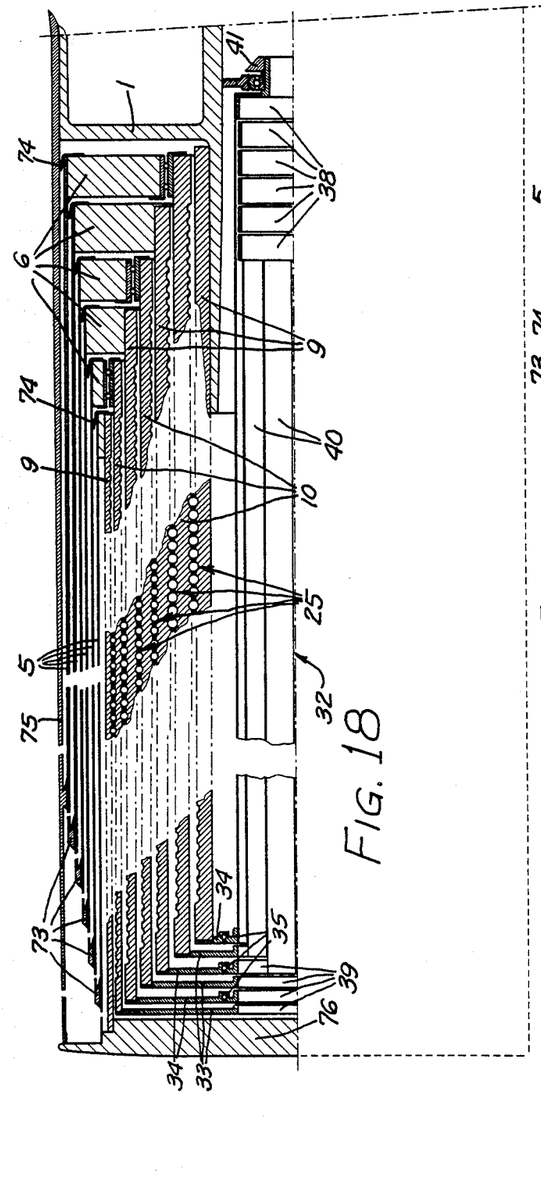
FIG. 18 is a view similar to FIG. 16, but showing another embodiment of the invention, wherein the outer spar sections telescope over the inner spar sections, and the outer skin sections telescope into the interior of the inner skin sections.
Figure 19:
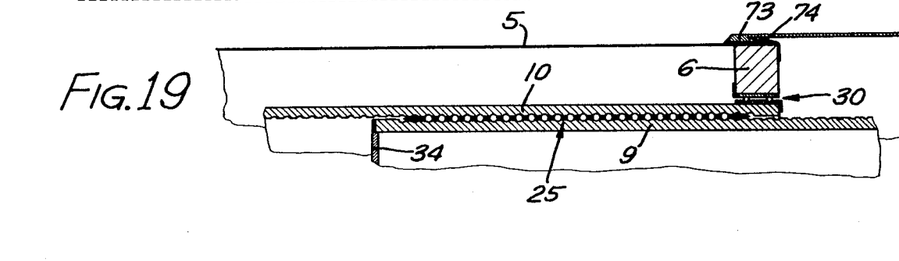
FIG. 19 is a fragmentary sectional view similar to FIG. 17 but showing the spar and skin arrangement of FIG. 18.

FIGS. 18 and 19 are similar to FIGS. 16 and 17, respectively, except that in this case, the outer spar sections 9, 10 telescope over the inner spar sections, and the outer skin sections 5 telescope into the interior of the inner skin sections. Accordingly, the ribs 6 are attached to the inner ends of the spar sections 9 and 10, and the spar disks 33 and 34 are attached to the outer ends of the spar sections. In like manner, the formation 73 are attached to the outer ends of the skin sections, and their respective flanges 74 are attached to the ribs 6 at the inner ends of the skin sections. The central housing 1 has a laterally extending cover 75, which forms an enclosed compartment in which the retracted wing is contained, the said compartment being closed by end plates 76 at the outer ends of each of the outer wing sections. FIG. 19 is a fragmentary sectional view of the wing of FIG. 18 in the extended condition, showing the interlocking engagement of the formation 73 with its associated flange 74.

Figure 20:
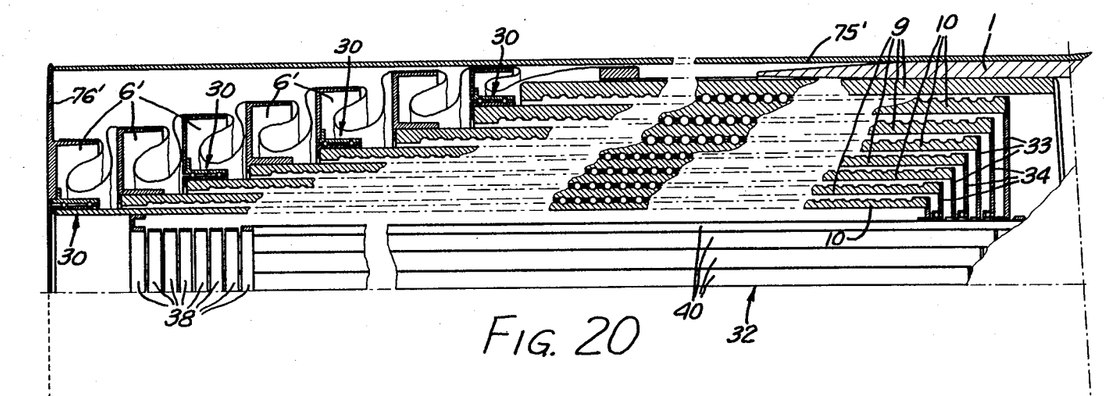
FIG. 20 is a view similar to FIG. 16, but showing the wing skin made of flexible material which is attached, in turn, to each of the ribs, forming a continuous unbroken surface when the wing is extended.
Figure 21:
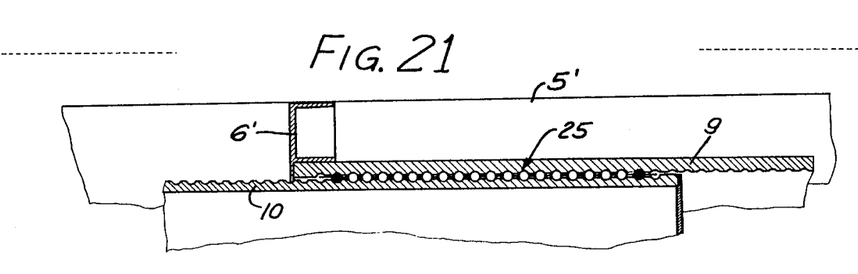
FIG. 21 is a view similar to FIG. 17, but showing the flexible skin and spar arrangement of FIG. 20.

FIGS. 20 and 21 are also similar to FIGS. 16 and 17 in the respect that the outer spar sections telescope into the inner spar sections, but differ in that the rigid skin sections 5 of FIGS. 16, 17 have been replaced by a continuous flexible skin 5' that is attached to all of the ribs 6'. The ribs 6' are cut away on their inner sides to provide cavities into which the folds of flexible skin material are received when the wing is retracted, as shown in FIG. 20. As in FIG. 18, this embodiment of the invention has a cover 75' extending laterally from the central housing 1, and this is closed by an end plate 76'. Since the retracted wing of FIG. 20 does not have the attached rigid skin sections on top of the spar sections, as in FIGS. 16 and 18, the complete profile height of the enclosure formed by cover 75 can be utilized to store a larger number of spar sections, which would allow for a longer wing span. The flexible skin 5' allows for a greater disparity between the profile of the outer wing section and the inner root section, permitting use of tapered wing plans or variations in the profile from root to tip. Among other advantages, the flexible skin 5' is more economical to produce than the rigid skin sections 5 of the earlier embodiments, and its lack of discontinuities makes for smoother laminar flow of air over the wing. The lack of discontinuities in the skin is clearly shown in FIG. 21.

FIGS. 22 and 23 are enlarged fragmentary sectional views through a portion of one rib and the skins of two wing sections in the extended wing condition, showing the interlocking relationship between formation 73 and flange 74. Flange 74 is seen to have an inwardly turned portion 77 that lies against the side of rib 6 and is attached thereto at 78 by rivets or other suitable connectors.

FIGS. 24 and 25 show another embodiment of the interlock arrangement between the skin 5 of one wing section and the skin of an adjoining section. In this case, the skins 5 are provided on their inner surfaces with a plurality of spaced-apart, span-wise extending stiffeners, which form channels 80 beteeen them. An L-shaped bracket 81 is attached to rib 6, and has a flange 82 that fits over and interlocks with the tapered inside edge of formation 73. Bracket 81 also has an inwardly turned portion 83 that lies against the side of rib 6, and is attached thereto at 84. The virtue of this arrangement is that it stiffens the skin considerably.

FIG. 26 is a fragmentary perspective view of one wing skin 5, showing the channels 80 in the interior surface, as well as the interlocking formation 73 at the end of the skin section.

FIGS. 27 and 28 show still another embodiment of the interlock arrangement between the skin 5 of one wing section and the skin of an adjoining section. In this instance, the interlock member attached to the side of rib 6 is designated by the reference numeral 85 and has T-shaped cross section, with a horizontal top flange 86 and vertical flange 87. Top flange 86 is interrupted at regularly spaced intervals and is undercut to form slots 88. Extending down into the gaps formed by the interruptions in top flange 86 are stiffeners 89 that are attached to the inside surface of the skin 5 and extend in the span-wise direction. The stiffeners 89 each has a flange 90 on its bottom surface that extends laterally into the undercut slot 88. The flanges 90 and stiffeners 89, together with skin 5, form C-shaped channels 91. The top flanges 86 thus interlock with the C-shaped channels 91, which prevents separation of the skins 5 at all times during extension and retraction of the wings, instead of only at the fully extended condition, as in the case of the embodiment of FIGS. 22, 23 and FIGS. 24, 25.

Figures 29, 30:
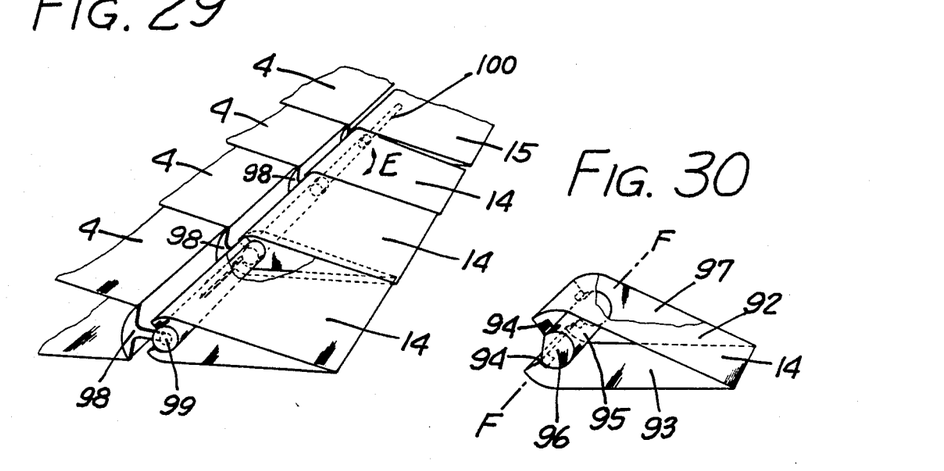
FIG. 29 is a fragmentary perspective view of the rear portion of an extended wing, showing one aileron and a portion of the associated flap, both of which telescope with the wing sections.
FIG. 30 is a partially cut-away view of one section of the aileron of FIG. 29.

FIG. 29 is a fragmentary perspective view of the rear portion of an extended wing, showing one aileron and a portion of the associated flap, both of which telescope with the wing section, while FIG. 30 is a partially cutaway view of one section of the aileron. In this instance, the wing construction is of the type wherein the outer wing sections 4 telescope into the interior of the inner wing sections, and likewise, the outer aileron sections 14 telescope into the inner aileron sections. The aileron sections 14 also telescope into the flap sections 15. As best shown in FIG. 30, the aileron sections 14 each comprise a top skin 92 and bottom skin 93 which are joined together at their rear edges, and are connected at their forward edge by inwardly turned walls 94 that are joined to a tubular portion 95. The tubular portion 95 is closed at one end by an end wall 96, and the other end is connected to a rib 97, which is attached to the top and bottom skins 92 and 93. The rib end of one aileron section telescopes into the open end of the adjoining inner section, so that rotational movement of one section causes all of the aileron sections to rotate as onw.

Attached to the open outer end of each wing section 4 at the rear edge thereof is a rearwardly projecting bearing support member 98 that extends through the opening in the tubular portion 95 between the walls 94, and has a bearing 99 supporting the tubular portion. The bearing 99 thus defines the rotational axis F—F of the aileron sections 14. Rotational movement of aileron sections 14 about the axis of bearing 99, as indicated by the arrow E, is accomplished by means of a telescopic drive mechanism 100, shown schematically in FIG. 29, which might be similar to the mechanisms shown in FIGS. 11 or 12.

Figures 31, 33:
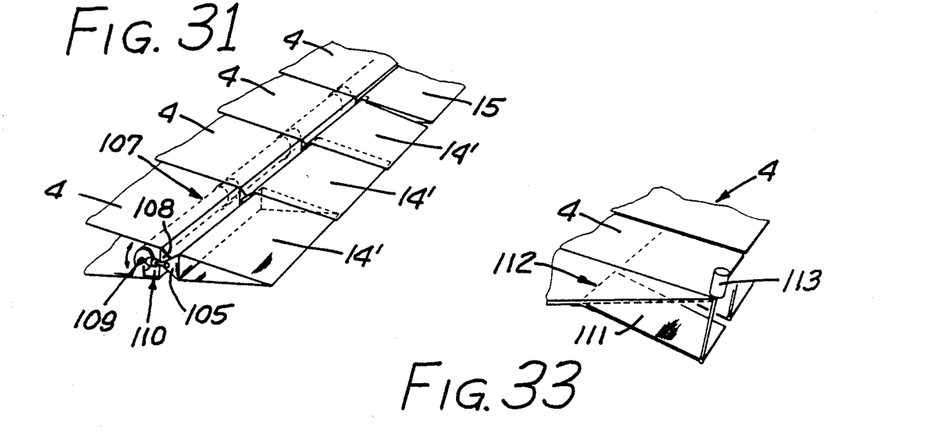
FIG. 31 is a view similar to FIG. 29, but showing another embodiment of the aileron skin and drive arrangement, wherein the telescopic drive tube for operating the aileron is contained within the wing sections.
FIG. 33 is a fragmentary perspective view of a wing, showing an alternative split flap arrangement.
Figure 32:
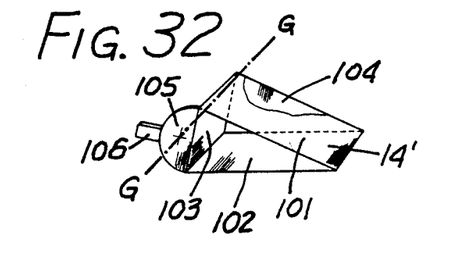
FIG. 32 is a view similar to FIG. 30, but showing the aileron skin arrangement of FIG. 31.

FIG. 31 is a view similar to FIG. 29, but showing another embodiment of the aileron skin and drive arrangement, wherein the telescopic drive tube for operating the aileron is contained within the wing sections. The ailerons are here designated by the reference numeral 14', and are constructed, as best shown in FIG. 32, with a top skin 101 and bottom skin 102 which are joined together at their rear edges, and connected at their forward edge by a wall 103. The aileron 14' is open at one end, and is closed at the other end by a rib 104. The wall 103 has a forwardly bent flange 105 at one end, through which a rotational axis G—G extends, and projecting from flange 105 radially with respect to axis G—G is a tab 106, which is attached to any suitable motion-transmitting means connecting the aileron to a telescopic tubular drive shaft 107 inside the wing sections 4. The aileron 14' of FIG. 32 of slightly different configuration that the aileron 14 of FIG. 31, but such differences are immaterial, as they function in the same manner. Flange 105 is connected to another flange 108 projecting rearwardly from the trailing edge of the wing section 4, by suitable bearing means (not shown) which allows rotational movement of the aileron about the axis G—G. The outer end section of the telescopic drive shaft 107 is rotationally supported by a bearing 109 on the outer end of its respective wing section 4, and the outer ends of the drive shaft sections are rotatably supported on their respective ribs by bearing means (not shown). The inner end of each aileron section is telescopically received within the adjacent inner aileron section, in the same manner that the wing sections 4 telescope. The motion-transmitting means 110 thus connects the outer aileron sections 14' to the telescopic drive shaft 107 in a manner whereby rotation of the drive shaft causes the outer aileron section 14' to rotate, and the latter, being telescopically interlocked with the other aileron sections, causes the aileron assembly to rotate as one. The advantage of this arrangement is that the aileron structure is much simpler than the one shown in FIGS. 29 and 30.

FIG. 33 shows an alternative split flap arrangement, which is probably the simplest flap arrangement that could be used with the telescopic wing. In this embodiment, the trailing edge of the bottom skin of wing section 4 has a flat plate 111 hinged at 112, which can be raised and lowered by an actuator 113. The flat plate 111 can be lowered only when the wing is fully extended, and the plates 111 would be raised prior to retraction of the wing. This arrangement makes possible the simplest wing construction, providing an unbroken airfoil profile at the root section of the wing, into which the outer wing sections with ailerons can be retracted.

It is believed that the operation of the present invention is more or less clear from the foregoing description. However, to summarize: the extended wing is retracted by causing the drive mechanism 32 to rotate in the appropriate direction, using either a motor or manually operated hand wheel. The rotating drive mechanism 32 turns the rotatable spar sections 10, which are located between pairs of non-rotatable spar sections 9, and this relative rotational movement between rotatable and non-rotatable spar sections, with their helical thread means of opposite hand at opposite ends, causes the spar sections to telescope together. The synchronous rotation of all of the rotatable spar sections causes each spar section, both rotatable and nonrotatable, to telescope with the adjacent inner spar section. Each spar section carries with its the associated rib and skin section, including their respective aileron and flap sections. In the fully retracted condition, the telescoped wing sections are either enclosed within the central housing or are placed in the area of the central housing, where they may occupy as little as 30% of the extended wing span, or even be enclosed entirely within the width of the fuselage. Due to the preloaded rolling element bushings between overlapping spar portions for a substantial distance, the spars retain their load-carrying capability throughout the entire range of extension and retraction. The spar sections may be telescoped into or over the adjoining inner spar section, and in like manner, the skin sections may telescope into or over the adjoining skin sections, as design considerations may dictate. The separate wing sections may be constructed with the skin and spar sections extending from opposite sides of the rib, or both extending from the same side of the rib.

To extend the retracted wing, the drive mechanism 32 is rotated in the opposite direction, causing the spar sections to extend from the adjoining inner spar section, carrying their respective rib and skin sections with them.

To clarify the meaning of the claims, the terms "inner" and "outer" refer to span-wise directions, the term "inner" meaning toward the root end of the wing, or fuselage, and the term "outer" meaning toward the tip end of the wing. The term "thread means" as used in the claims refer to the thread-like helical grooves or channels formed in opposed surfaces of the overlapping spar sections, in which rolling elements such as ball bearings travel. The helical grooves are of right-hand direction at one end of each spar section, and of left-hand direction at the other end of the same spar section. Thus, the term "thread means" could include conventional threads, although such conventional threads are believed tobe less desirable than the rolling element bushing shown and described herein due to tolerance and frictional problems. The thread means connecting overlapping spar sections provides form-closed, interlocking connections which prevent any linear movement of spar sections relative to one another without relative rotation. With the form-closed connection it would be necessary to destroy the interlocking parts of the connection in order to realize relative linear movement between spar sections.

While I have shown and described in considerable detail what I believe to be the preferred form of my invention, it will be understood by those skilled in the art that the invention might take various other forms within the scope of the following claims.

What I claim is:

1. An extendable and retractable spar comprising:
   a plurality of tubular spar sections arranged on a common axis, with each spar section overlapping the adjacent spar sections;
   alternate spar sections being rotatable, and intermediate spar sections being non-rotatable;
   thread means interconnecting the overlapping portions of said spar sections, the thread means at one end of each spar section being of right-hand direction, and the thread means at the other end being of left-hand direction;
   said thread means including a rolling element bushing interposed between the overlapping portions of said spar sections, said rolling element bushing consisting of a plurality of rolling elements running in helical grooves formed in opposed surfaces of said overlapping spar sections, and a cage confining said rolling elements so that they remain in the same relative positions to one another at all times; and
   means for rotating said rotatable spar sections, thereby causing the spar to extend or retract depending upon the direction of rotation.

2. An extendable and retractable spar as in claim 1, wherein said rolling elements are a plurality of ball bearings.

3. An extandable and retractable spar as in claim 1, wherein said means for rotating said rotatable spar sections comprises a rotatable telescopic member disposed centrally within said tubular spar section; said telescopic member being fixedly connected to said rotatable spar sections and rotatably connected to said non-rotatable spar sections; and means for driving said telescopic member.

4. A telescopic wing comprising a plurality of wing sections and a tubular spar extendingfrom the root end of the wing to the tip end thereof, said spar comprising a plurality of spar sections of which alternate sections are rotatable and intermediate sections are non-rotatable; each of said spar sections overlapping the adjacent spar section;

said wing sections including ribs fixedly connected to the non-rotatable sections of said spar, and being rotatably connected to the rotatable sections of the spar;

wing skins attached to said ribs;

thread means interconnecting the overlapping portions of said spar sections, the thread means at one end being of right-hand direction and the thread means at the other end being of left-hand direction; and means for rotating said rotatable spar sections, thereby causing the spar to extend or retract, depending upon the direction of rotation, carrying the ribs and skin sections with them.

5. A telescopic wing comprising a plurality of wing sections and at least two parallel tubular spars extending from the root end of the wing to the tip end thereof, each of said spars comprising a plurality of spar sections of which alternate sections are rotatable and intermediate sections are non-rotatable, each of said spar sections overlapping the adjacent spar sections;

said wing sections including ribs connected to the corresponding sections of said two spars, said ribs being fixedly connected to the non-rotatable sections of said spars, and being rotatably connected to the rotatable sections of said spars;

wing skins attached to said ribs;

thread means interconnecting the overlapping portions of said spar sections, the thread means at one end being of right-hand direction and the thread means at the other end being of left-hand direction; and means for rotating said rotatable sections, thereby causing the spars to extend or retract simultaneously depending upon the direction of rotation, carrying the ribs and skin sections with them.

6. A telescopic wing as in claim 5, wherein said tubular spar sections diminish in diameter from the root end of the wing to the tip end thereof, and each of said spar sections telescopes into the interior of the adjacent spar section at the inner end thereof.

7. A telescopic wing as in claim 5, wherein said tubular spar sections increase in diameter from the root end of the wing to the tip end thereof, and each of said spar sections telescopes over the outside of the adjacent spar section at the inner end thereof.

8. A telescopic wing as in claim 5, wherein said wing skins are made of rigid sheet material formed to the wing profile, said wing skins being divided into separate sections in which each skin section is attached at its inner end to its respective rib, with the outer end overlapping the skin section of the adjacent outer wing section, and each of said skin sections telescoping into the interior of the adjacent inner skin section as the wing is retracted.

9. A telescopic wing as in claim 5, wherien said wing skins are made of rigid sheet material formed to the wing profile, said wing skins being divided into separate sections in which each skin section is attached at its outer end to its respective rib, with the inner end overlapping the skin section of the adjacent inner wing section; and each of said skin sections telescoping over the outside of the adjacent inner skin section as the wing is retracted.

10. A telescopic wing as in claim 5, wherein said wing skins are made of rigid sheet material formed to the wing profile, said wing skins being divided into separate sections in which each skin section is attached at one end to its respective rib and extends laterally therefrom, each of said spar sectins being attached to its respective rib on the same side as the wing skin and extending laterally into the interior of the wing skin.

11. A telescopic wing as in claim 5, wherein said wing skins are made of rigid sheet material formed to the wing profile, said wing skins being divided into separate sections in which each skin section is attached at one end to its respective and extends laterally therefrom, each of said spar sections being attached to its respective rib on the side opposite the wing skins.

12. A telescopic wing as in claim 5, wherein said wing skins are of flexible material attached to said ribs, said flexible skin material being capable of being folded into a compact space between adjacent ribs when the wing is retracted, and being stretched taut when the wing is extended.

13. A telescopic wing as in claim 5, wherein said means for rotating said rotatable spar sections comprises a rotatable telescopic drive member disposed centrally within each of said tubular spars; said telescopic drive member having a plurality of sections, certain of said sections being fixedly connected to said rotatable spar sections, and others of said telescopic drive sections being rotatably connected to said non-rotatable spar sections; and means at the root end of the wing for driving said telescopic drive member.

14. A telescopic wing as in claim 5, wherein said means for rotating said rotatable spar sections comprises motor means mounted on certain of said ribs to which rotatable spar sections are connected; and power transmission means connecting said motor means to the rotatable spar sections on the rib on which said motor means is mounted.

15. A telescopic wing as in claim 5, further characterized by skin interlock means comprising formations at the outer ends of the skin sections, said formations each including an inwardly turned flange; spanwise C-type channels formed on the inside surface of the skin having opposed, inwardly turned flanges; and a member attached to the inner side of each rib and having portions extending into said C-type channels, with outwardly extending flanges that overlie said inwardly turned flanges of said C-type channels, said members also having an outwardly turned flange that is engageable over said inwardly turned flange on said formation to interlock the outer end of the skin section to the rib of the next adjacent wing section when the wing is fully extended; said member and its sliding engagement with said C-type channels serving to guide said skin relative to the adjacent rib as the wing is extended and retracted.

16. A telescopic wing as in claim 5, further characterized by having means for locking the rotatable spar sections against turning when the wing is fully extended.

17. A telescopic wing as in claim 5, further characterized by having means mounted on the ribs for interlocking the rotatable spar sections with the non-rotatable spar sections when the wing is fully extended thereby preventing relative movement between them.

18. A telescopic wing as in claim 5, characterized by having ailerons comprising a plurality of generally wedge-shaped sections telescopically joined together; said aileron sections being pivoted on the trailing edges of the corresponding wing section; control means comprising a telescopic drive structure contained within the wing and extendable and retractable therewith; and means connecting said control means to one of the end aileron sections for moving the latter, said one aileron section transmitting control movement to the next adjacent aileron section by virtue of their overlapping wedge-shaped configuration.

19. A telescopic wing as in claim 5, further characterized by having telescopic aileron sections embodying integral control and structural means, said aileron sections being generally wedge-shaped and having upper and lower skins connected at one end to a rib, the other end being open; an open-sided, generally tubular portion that is open at one end and has a wall closing the other end, said open end of the tubular portion being connected to said rib, said upper skins passing over and said lower skins passing under said tubular portion and being spaced radially therefrom; the forward ends of said upper and lower skins being connected by wall portions to said tubular portion adjacent the edges of the opening in the side of the tubular portion; bearing means mounted on the trailing edges of the wing sections and extending through said opening in said tubular portion and pivotally connected with the end wall of the tubular portion; and control means connected to the tubular portion of one aileron end section, said one aileron section transmitting control movement to the next adjacent aileron section by virtue of the contact between the wall portions of one aileron section and the wall portions of the next adjacent aileron section, together with the overlapping wedge-shaped configuration of the aileron sections.

20. A telescopic wing as in claim 5, wherein there are flaps mounted on the underside of the wing section at the trailing edge thereof, said flaps being hinged for vertical swinging movement between a retracted position flush with the bottom wing skin, and a downwardly angled, extended position; and an actuator for moving said flaps from one of said positions to the other.

* * * * *